United States Patent von Meyerinck et al.

[11] Patent Number: 4,658,874
[45] Date of Patent: Apr. 21, 1987

[54] FUELING ARM

[76] Inventors: Wolfgang von Meyerinck, Espenstrasse 5, D-6346-Langgoens; Dietz von Meyerinck, Arnsburger Strasse 14, D-6302-Lich, both of Fed. Rep. of Germany

[21] Appl. No.: 873,073

[22] Filed: Jun. 2, 1986

Related U.S. Application Data

[63] Continuation of Ser. No. 684,449, Dec. 21, 1984, abandoned.

[30] Foreign Application Priority Data

Jul. 4, 1984 [EP] European Pat. Off. ........ 84107765.4

[51] Int. Cl.$^4$ ............................ B65B 3/04; B67D 5/68
[52] U.S. Cl. .................................... 141/387; 137/615; 285/162; 285/168
[58] Field of Search ................................ 141/250–284, 141/387, 388, 389; 137/615; 285/162, 168

[56] References Cited

U.S. PATENT DOCUMENTS 1,885,886  11/1932  Banks ................................. 285/168
3,724,499   4/1973  Huniu ................................. 137/615

Primary Examiner—Houston S. Bell, Jr.
Attorney, Agent, or Firm—Flynn, Thiel, Boutell & Tanis

[57] ABSTRACT

A fueling arm without the need for any hoses which can be connected to a supply line, particularly for tank cars and aircraft fueling, is disposed in a chute. To assure effortless handling and reduce fueling time, the fueling arm includes at least eight pipe sections which are connected by swivel joints, wherein at one end of a first pipe section there is a first of the swivel joints. The axes of rotation of the first and of successive second and third swivel joints are parallel. The first swivel joint can be connected to a supply line and the third swivel joint is guided in a direction of movement thereof. A headpiece with a filler-neck coupling thereon is connected by a fourth swivel joint to a second of the pipe sections which is also connected to the third swivel joint. The headpiece has a line which includes five of the pipe sections and, of the five swivel joints connected to the line, three have parallel axes of rotation and the remaining two have axes perpendicular to the axes of the other three.

16 Claims, 5 Drawing Figures

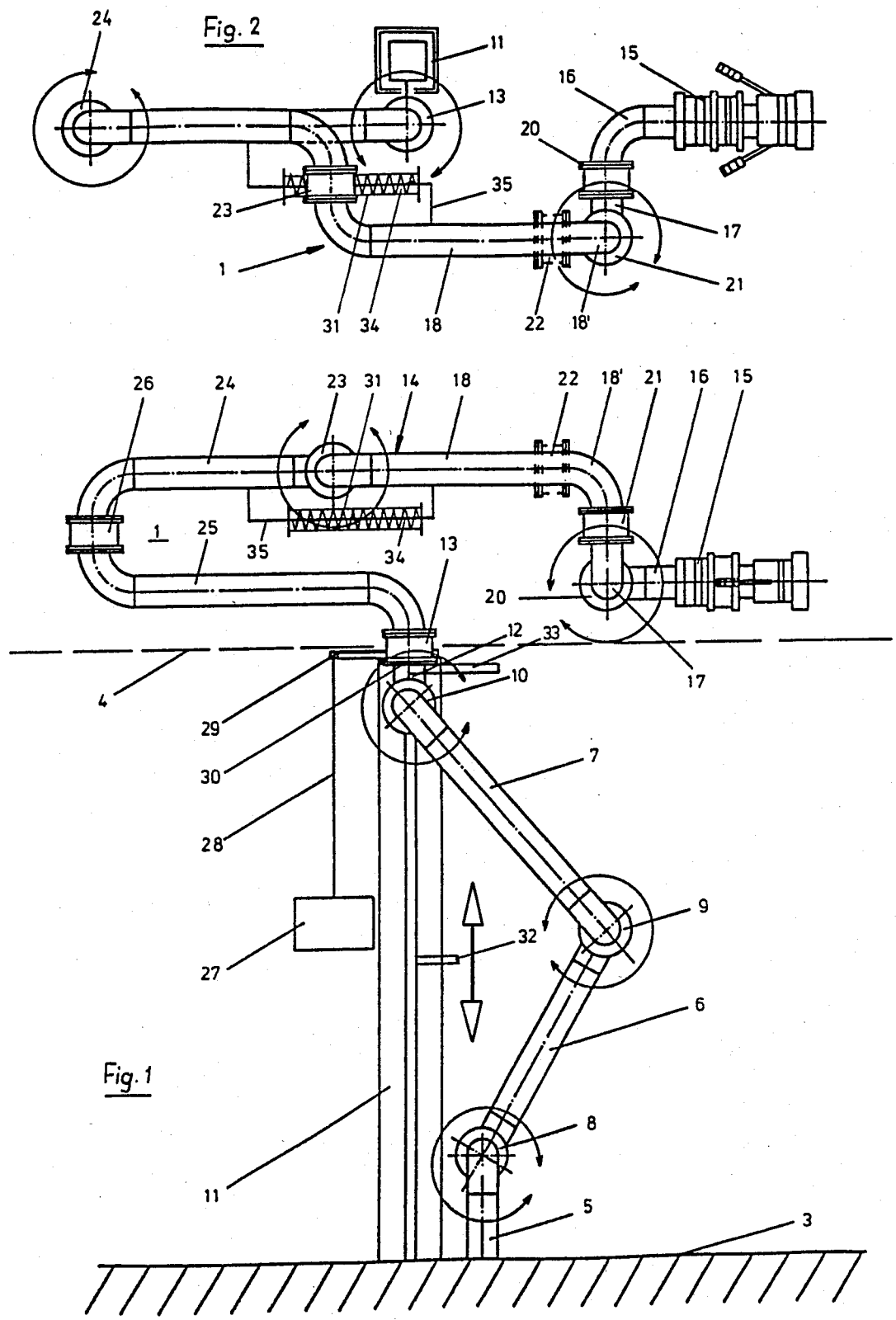

FUELING ARM

This application is a continuation of U.S. Ser. No. 684,449, filed Dec. 21, 1984, now abandoned.

FIELD OF THE INVENTION

This invention relates to a fueling arm which can be connected to supply lines, particularly for tank cars and aircraft fueling, and which has a filler-neck coupling.

BACKGROUND OF THE INVENTION

For fueling aircraft or tank cars from a supply system, it is known to arrange the connection or supply line in a chute below or laterally of a driving surface for the vehicles and to carry out the filling of an aircraft or tank car with the help of a hose which is connected to the supply line. When using a hose, the nominal diameter is limited to a maximum of 3", namely for the reason that, in the case of a larger nominal size, the hose can no longer be handled. Moreover, in the case of the use of a hose, the disadvantage exists that it can be pulled only with great difficulty out of the chute and can be connected to the tank coupling only with great difficulty, due to the high weight and considerable tensions of the hose. Furthermore, damage often occurs while removing the hose from the chute, because it must then be pulled over the edges of the chute. These difficulties during pulling out and reinserting the hose into the fueling chute are the reason such hoses are often left spread out on the ground, so that the danger often exists that they may be run over by a vehicle.

Further, wear occurs also to the filler-neck coupling, since it always lies on the ground or is pulled over the ground.

A basic purpose of the invention is to provide a fueling arm of the above-mentioned type which can, with the simplest handling and in an effortless manner, be connected to the tank coupling, which is constructed with a nominal diameter corresponding to the speed needed for a quick fueling, and which is practically wear free and maintenance free and can be sunk into a chute.

SUMMARY OF THE INVENTION

This purpose is attained by providing a fueling arm which includes at least eight pipe sections which have nominal diameters selected to correspond to the required fueling speed and which are connected to each other by at least seven swivel joints. The first three swivel joints, which in a flow direction away from the supply line lie one after the other, have axes of rotation which are all parallel to one another and perpendicular to the pulling-out direction of the fueling arm. If the fueling arm is, for example, arranged in a chute and must be lifted out of the chute for fueling, then the axes of rotation extend horizontally. The third swivel joint is guided by a guide arrangement for movement in a direction of movement thereof, and corresponds in its path of movement with the lifting movement of the fueling arm. The third joint is followed by a fourth swivel joint which is arranged with its axis of rotation perpendicular to the axis of rotation of the third swivel joint and, in the case where the fueling arm is arranged in a chute and is moved vertically, such axis extends in a vertical direction and thus permits swinging of the headpiece of the fueling arm in horizontal directions. The fourth swivel joint is a swivel joint of the head piece having the tank coupling, which in turn includes five pipe sections connected by four swivel joints which, like the other joints, each have only one degree of freedom. Of the five swivel joints connected to the headpiece, three have axes of rotation which are parallel to one another, and the axes of rotation of the remaining two are parallel to one another and perpendicular to the axes of rotation of the other three joints.

The weight of the entire fueling arm is preferably supported by a counterbalance weight, which compensates at least the entire weight of the fueling arm. Through this, it is achieved that, after unlocking the fueling arm, it moves automatically out of the chute and remains in a position in which the headpiece is movable freely over its path of travel. For moving the fueling arm back into the chute, only a small force is needed, which can easily be produced by the weight of the operator. In the inserted position, the fueling arm is locked in position by a locking mechanism. Thus, it is not necessary to provide a hydraulically or electrically operated extending mechanism for lifting the arm.

According to a further suggestion of the invention, the headpiece can be supported by a balance unit with respect to the remaining parts of the fueling arm, so that the headpiece will maintain a given position in space with the application of little or no external force thereto. This balance mechanism can, for example, include a spring package and a bar connected to two of the pipe sections which are connected by the first swivel joint which follows the fourth swivel joint and has a horizontal axis of rotation.

BRIEF DESCRIPTION OF THE DRAWINGS

One exemplary embodiment of the invention will be described in greater detail in connection with the drawing, in which:

FIG. 1 is a side view of a fueling arm which embodies the invention and is arranged in a chute;

FIG. 2 is a top view of the fueling arm of FIG. 1;

DETAILED DESCRIPTION

Figure 3:
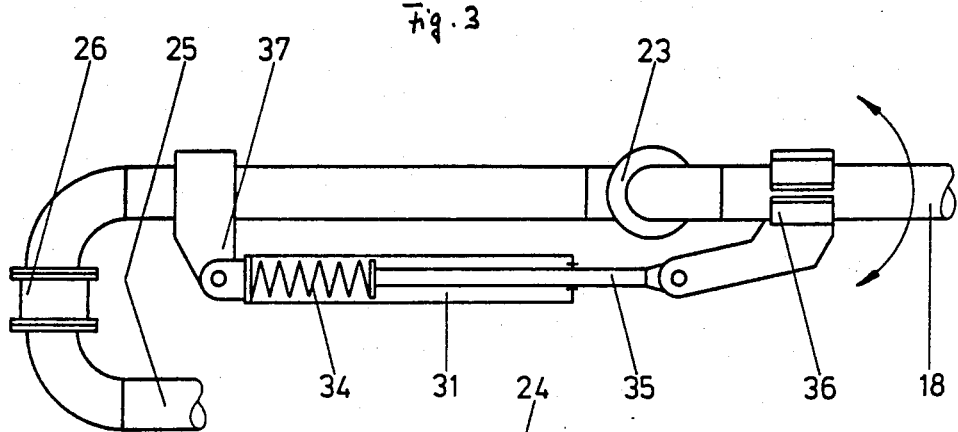
FIG. 3 is a side view of a portion of the fueling arm of FIG. 1.

A fueling arm is identified as a whole with reference numeral 1 and is arranged in a trough or chute, the bottom of the chute being identified with reference numeral 3 and an upper edge of a sidewall thereof being identified with reference numeral 4. Two pipe sections 6 and 7 are movable generally vertically, and the section 6 is coupled by a first swivel joint 8, the axis of rotation of which is horizontal, to a stationary supply line 5 which comes from an underground storage tank. The two pipe sections 6 and 7 are pivotally coupled to each other by a second swivel joint 9 which also has a horizontal axis of rotation. A third swivel joint 10 is arranged at the upper end of the pipe section 7, has an axis of rotation which is horizontal, and is vertically movably supported on a vertically extending guide rail 11. The third swivel joint 10 can carry out a vertical movement which corresponds in height with the height of the guide rail 11. An arcuate pipe section 12 is connected at one end to the third swivel joint 10 and at its other end to a fourth swivel joint 13, the axis of rotation of which is perpendicular to the axis of rotation of the third swivel joint, namely, it extends vertically. The fourth swivel joint is a swivel joint for a headpiece which, as a whole, is identified with reference numeral 14 and which includes a filler-neck coupling 15. This filler-neck coupling is a conventional component and is provided for effecting a connection to the tank valve of an aircraft or a tank car.

The headpiece 14 includes five pipe sections 16-18, 24 and 25 which are connected by swivel joints 20, 21-23 and 26. The fourth swivel joint 13 is connected to the pipe section 25, which is in turn connected to the pipe section 24 by the swivel joint 26, through which the maximum distance of the filler-neck coupling 15 from the chute 2 is decisively determined. The pipe section 18 is connected to the pipe section 24 by swivel joint 23 and can, if desired, be divided into two parts 18 and 18' coupled by a further, optional swivel joint 22. The swivel joint 22 increases the elevational reach of the coupling 15 by the distance between the joints 20 and 22.

A plane containing the axis of rotation of the joint 20 is parallel to the axis of rotation of the joint 22. The swivel joint 21, which is between the joints 20 and 22, has an axis of rotation which is perpendicular to the axis of rotation of the joint 20. The swivel joint 23 which connects the pipe sections 18 and 24 has its axis of rotation perpendicular to the axis of rotation of the swivel joint 13. Through this special arrangement of the joints, it is possible to adjust the filler-neck coupling 15 to any orientation in space without subjecting the fueling arm to a moment.

A counterbalance weight 27 is arranged in the chute and is supported by a line 28 which extends over guide rollers 29 and 30 and is connected to the pipe section 12. The weight 27 is selected so that it is slightly heavier than the weight of the fueling arm 1, so that the fueling arm 1 is always urged by the weight 27 toward the extended or raised position shown in FIG. 1. However, the weight 27 is chosen just heavy enough so that not only the weight of the fueling arm 1 is balanced, but also any existing friction in the guide rail 11, so that the fueling arm, after the release of a locking mechanism 32 which is illustrated in detail, is moved firmly to its raised position. The moving of the fueling arm down into the chute is effected, after swinging in of the headpiece, by the weight of the operator, who manually applies a force to the stepping surface 33. The fueling arm is then locked again in the chute with the locking mechanism 32. Thus, operation is possible with minimal effort by a single person, whereby also the easy handling capability of the fueling arm, including the headpiece, is assured by the position of the joints, and it is additionally achieved that the filler-neck coupling can be connected to the tank valve free of any moment.

The two pipe sections 18 and 24, which are connected by the swivel joint 23 having an axis of rotation which is horizontal, are each connected to a balance unit 31 which includes a spring package 34 and a pressure bar 35. The initial tension of the spring package 34 can be adjusted to a value causing the balance unit 31 to balance the weight of the headpiece 14, so that the filler-neck coupling 15 is always maintained in its position in space, or rather can be moved and held in a given position with only a small force, and thus the fueling arm also does not apply its weight to the tank adapter.

The arcuate pipe section 12, due to the guide rail 11, can only move vertically. Thus, the pipe section 25 is always positioned horizontally, as is the pipe section 24, which is connected to the pipe section 25 by the swivel joint 26 for rotation about a vertical axis. Thus, the pipe section 24 can carry out only movement in horizontal directions, and not movements in a vertical direction. This means that, for vertical movement of the pipe section 18, the pipe section 24 serves as a support.

Figure 4:
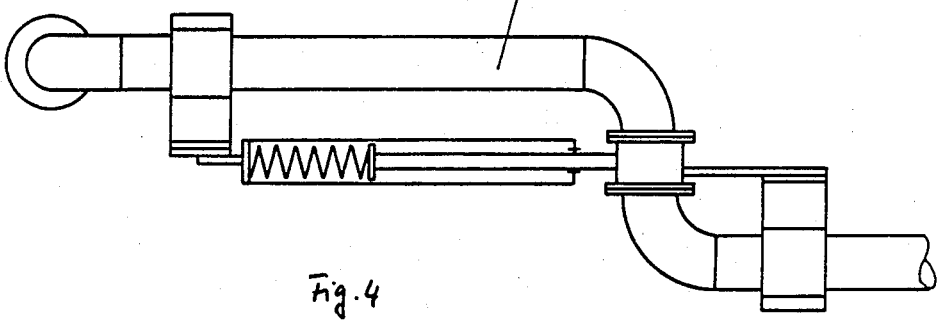
FIG. 4 is a top view of a portion of the fueling arm of FIG. 1.

The weight of the head piece 14 is balanced by the balance unit 31. Referring to FIGS. 3 and 4, this is done by the load being transmitted through the pressure bar 35 to a spring in the spring package 34.

A fastening member 37 is fixedly connected to the pipe section 24 and supports the spring package 34. A fastening member 36 is pivotally connected to the rod 35 and is connected to the pipe section 18 by screw clamps, so that with simple manipulations the member 36 can be moved axially of the pipe in order to change the initial tension of the balance unit.

Figure 5:
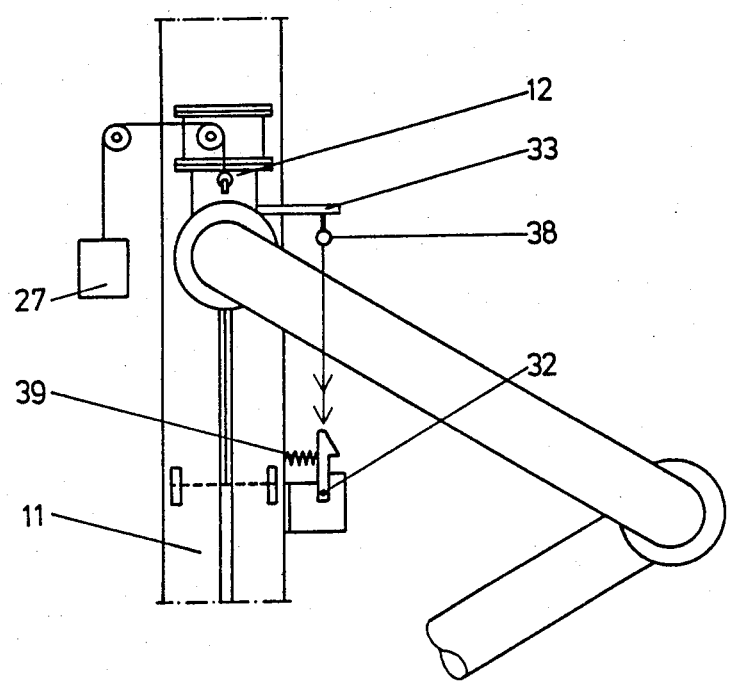
FIG. 5 is a side view of a portion of the fueling arm of FIG. 1.

The fueling arm can be moved downwardly on the rail 11 by the pedal 33 secured on the guide elbow 12. As shown in FIG. 5, catching hook 38 is secured on the pedal 33. Upon reaching the lowermost position of the fueling arm, the catching hook 38 engages the locking mechanism 32. The spring 39 ensures a secure locking. The locking mechanism 32 can easily be released manually, after which the fueling arm is automatically moved upwardly with the help of the balance weight 27.

Thus, a fueling arm according to the invention has the advantage that it does not need hose connections which can easily be damaged and have a medium life span of one to two years. The inventive fueling arm is also practically wear free and maintenance free, and service can be performed when servicing the filler-neck coupling, namely, at times separated by longer intervals. Moreover, it is also possible to construct the fueling arm with nominal diameters of over 3" without adversely influencing its handling capability. Through this, the conveying performance can be increased considerably and the necessary fueling time can be significantly reduced. Furthermore, the fueling safety is substantially increased in comparison to tank hoses, so that fueling near running motors and turbines is possible without danger. Through the easy servicing capability, it is moreover assured that the fueling arm, after use, will be moved back into the chute.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fueling arm which can be connected to a supply line, comprising a filler-neck coupling and eight pipe sections which are serially connected to each other by respective swivel joints which each have only one degree of freedom, wherein at one end of a first of said pipe sections there is arranged a first of said swivel joints which can pivotally couple said first pipe section to the supply line, wherein an axis of rotation of said first swivel joint and axes of rotation of second and third said swivel joints which successively follow said first swivel joint are disposed in planes which are parallel to one another, wherein said third swivel joint is movable and is guided by guide means for reciprocal movement parallel to a direction of movement, a second of said pipe sections being pivotally coupled to said first pipe section by said second swivel joint and to a third of said pipe sections by said third swivel joint, wherein said fueling arm includes a headpiece which includes said filler-neck coupling and each of said pipe sections other than said first, second and third pipe sections, wherein an end of said headpiece remote from said filler-neck coupling is connected by a fourth of said swivel joints to said third pipe section, wherein said headpiece is movable to a position in which three of said swivel joints thereof have axes of rotation which are parallel to one another and are perpendicular to the axes of the other two swivel joints thereof, wherein said axes of rotation of said first, second and third swivel joints are horizontal, and wherein said guide means includes a guide rail and includes one of said third swivel joint and said third pipe section being movably supported by said guide rail.

2. The fueling arm according to claim 1, including balance means operatively coupled to two adjacent said pipe sections of said headpiece for permitting a free swinging of said headpiece and for supporting the weight of said filler-neck coupling and of the pipe sections and swivel joints located between said balance means and said filler-neck coupling.

3. The fueling arm according to claim 1, wherein said guide rail extends generally vertically and said first swivel joint is located in the region of a lower end of said guide rail; and including a weight which is operatively coupled to said fueling arm and which yieldably urges said one of said third swivel joint and said third pipe section upwardly along said guide rail with a force which counterbalances the weight of said fueling arm.

4. The fueling arm according to claim 1, wherein said guide rail extends generally vertically, and wherein said fueling arm has a locking mechanism for releasably locking it in a retracted position in which said one of said third swivel joint and said third pipe section is in the region of a lower end of said guide rail.

5. The fueling arm according to claim 1, wherein one of said pipe sections includes two pipe parts coupled by a further swivel joint having an axis of rotation which is perpendicular to the axis of rotation of one of said first-mentioned swivel joints which is at one end of said one pipe section.

6. A fueling system, comprising: a stationary supply line; first, second and third pipe sections; first, second and third swivel joints which have parallel, horizontal axes of rotation, said first swivel joint pivotally coupling said supply line to one end of said first pipe section, said second swivel joint pivotally coupling the opposite end of said first pipe section to one end of said second pipe section, and said third swivel joint pivotally coupling the opposite end of said second pipe section to one end of said third pipe section; a fourth swivel joint provided at the opposite end of said third pipe section and having a vertical axis of rotation; and a headpiece line having one end coupled to said third pipe section by said fourth swivel joint and having at its opposite end a filler-neck coupling, said headpiece line including a plurality of further pipe sections connected in series by respective further swivel joints, successive said further swivel joints in a direction of fluid flow having perpendicular axes of rotation; and guide means supporting said third pipe section for approximately vertical movement between raised and lowered positions in which said third swivel joint is respectively spaced above and in the region of said first swivel joint, said guide means including an elongate vertical guide rail and means supporting said third pipe section on said guide rail for movement lengthwise thereof.

7. The fueling system according to claim 6, including means for yieldably urging said third pipe section upwardly toward said raised position thereof, and locking means for releasably holding said third pipe section in said lowered position thereof.

8. The fueling system according to claim 7, wherein said guide rail is tubular and has a lengthwise slot therein, and wherein said means movably supporting said third pipe section on said guide rail includes a guide member having a portion slidably disposed within said guide rail and having a portion which extends outwardly through said slot in said guide rail and is fixedly coupled to said third pipe section.

9. The fueling system according to claim 7, wherein said means yieldably urging said third pipe section upwardly includes pulley means rotatably supported in the region of an upper end of said guide rail, an elongate cable extending over said pulley means and having one end coupled to said third pipe section, and a counterweight connected to the opposite end of said cable.

10. The fueling system according to claim 7, wherein said locking means includes a catching hook fixedly supported on said third pipe section, a pivotally supported locking member which is engageable with said catching hook when said third pipe section is in its lowered position and which is manually movable to a position in which it is free of engagement with said catching hook, and a spring which pivotally biases said locking member toward said position thereof in which it is engageable with said catching hook.

11. The fueling system according to claim 10, including a pedal which is fixedly supported on said third pipe section and which has said catching hook fixedly supported on an underside thereof, wherein an operator can step on said pedal with a foot in order to cause said third pipe section to move downwardly from said raised position thereof to said lowered position thereof.

12. The fueling system according to claim 6, wherein said pipe sections of said headpiece line include fourth, fifth, sixth, seventh and eighth pipe sections and wherein said swivel joints of said headpiece line include fifth, sixth, seventh and eighth swivel joints, said fourth pipe section having one end pivotally coupled to said third pipe section by said fourth swivel joint and having its opposite end pivotally coupled to said fifth pipe section by said fifth swivel joint, said sixth pipe section having its ends respectively coupled to said fifth and seventh pipe sections by said sixth and seventh swivel joints, and said eighth pipe section having one end pivotally coupled by said eighth swivel joint to said seventh pipe section and having at its opposite end said filler-neck coupling; wherein said fifth swivel joint has a vertical axis of rotation, said sixth swivel joint has a horizontal axis of rotation, and said seventh and eighth swivel joints have axes of rotation which are perpendicular to each other.

13. The fueling system according to claim 12, including balance means operatively coupled to said fifth and sixth pipe sections for supporting the weight of said sixth, seventh and eighth pipe sections, said seventh and eighth swivel joints and said filler-neck coupling in any position to which they are moved.

14. The fueling system according to claim 13, wherein said balance means includes first and second fastening members respectively fixedly secured to said fifth and sixth pipe sections, a spring support pivotally supported on said first fastening member, an elongate pressure bar supported for lengthwise movement on said spring support and having an end pivotally coupled to said second fastening member, and a compression spring having its ends supported on said spring support and said pressure bar and continuously yieldably urging lengthwise movement of said pressure bar relative to said spring support.

15. The fueling system according to claim 13, wherein said sixth pipe section includes two separate pipe parts and an additional swivel joint which pivotally couples said pipe parts, said additional swivel joint having an axis of rotation which extends perpendicular to the axes of rotation of said sixth and seventh swivel joints.

16. The fueling system according to claim 13, wherein said first, second, fourth, fifth and sixth pipe sections each have a 90° arcuate end portion at each end thereof and a rectilinear central portion extending between said arcuate end portions, wherein said third and seventh pipe sections are each curved to form a 90° arc, and wherein said eighth pipe section has a 90° arcuate end portion adjacent said eighth swivel joint and then extends rectilinearly to said filler-neck coupling.

* * * * *